J. L. EBBELS.
BIRD CAGE PERCH.
APPLICATION FILED SEPT. 19, 1918.

1,297,811. Patented Mar. 18, 1919.

John L. Ebbels INVENTOR
John D. Morgan BY
ATTORNEY

UNITED STATES PATENT OFFICE.

JOHN L. EBBELS, OF NEW YORK, N. Y.

BIRD-CAGE PERCH.

1,297,811.     Specification of Letters Patent.     Patented Mar. 18, 1919.

Application filed September 19, 1918. Serial No. 254,748.

*To all whom it may concern:*

Be it known that I, JOHN L. EBBELS, a citizen of the United States, residing in the city and State of New York, have invented a new and useful Improvement in Bird-Cage Perches, of which the following is a specification.

The invention relates to bird cage perches and has for its principal object the provision of means for keeping the claws of the bird trimmed without the necessity of occasional clipping. The nuisance and danger of handling the bird for this service are thereby avoided, and the trouble and cost of the clipping operation are obviated.

The accompanying drawings, herein referred to and constituting a part hereof, illustrate my present preferred embodiment of the invention, and together with the description serve to illustrate the principles thereof.

Figure 1:
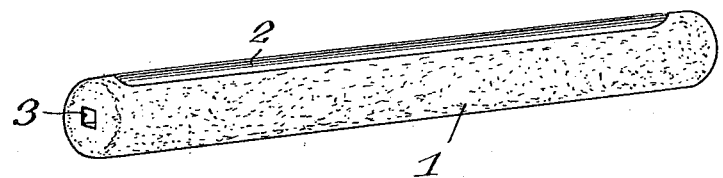
Figure 1 is a perspective of the perch member without the support.
Figure 2:
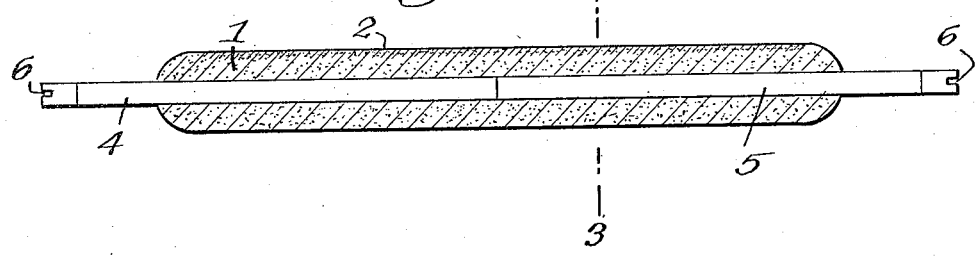
Fig. 2 is a central longitudinal section through the perch member with the internal supporting member shown in elevation.
Figure 3:
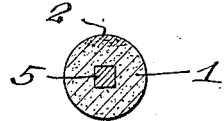
Fig. 3 is a transverse full section on the line 3—3 of Fig. 2.

Referring by way of example to the embodiment illustrated in the accompanying drawings, the perch is preferably of cylindrical form, and is constituted preferably of a suitable abradant material, such as potters' clay, or other suitable clay or material. The top part of the perch which would be directly beneath the feet of the bird is preferably smooth and such a smooth part is shown at 2 in Fig. 1. When the perch is made of burnt clay or like material, this part 2 may be polished, or glazed, or rendered smooth in any other desired manner.

The perch is made to fit cages of varying widths, and for this purpose a separate support is provided which may by changed in size to fit the particular cage. The perch and support are also formed so as to prevent rotation of the perch. As embodied, the perch 1 is apertured, centrally and longitudinally thereof, the aperture 3 being rectangular.

The perch support as embodied comprises two parts 4 and 5, which are rectangular in cross-section to fit the aperture 3, the ends of the two parts 4 and 5 preferably meeting and abutting within the aperture. At their respective outer ends the support members 4 and 5 are provided with slotted or forked ends 6 which are adapted to engage with the bars of the cage to hold the perch in position. The parts 4 and 5 may be made of wood and the tips 6 of metal. The inner end of either or both of the support members 4 and 5 can be cut off to make the support of proper width to fit the cage. They then may be inserted within the perch and the whole perch be slipped into position within the cage.

When the bird stands on the perch the smooth portion 2 will be beneath his feet, but his claws will engage with the abradant surface of the perch on either side thereof, and thus the bird's claws will be kept in proper and healthy condition.

It will be understood that changes may be made from the exact construction shown and described without departing from the principles of the invention.

What I claim is:—

1. A bird cage perch comprising an abradant bird support having a smooth portion directly under the feet of a bird standing on the perch and an abradant surface in contact with the claws.

2. A bird cage perch comprising a bird supporting member having a central, longitudinal aperture, angular in cross section, with slidable supports therein, the supports engaging the cage to support the perch.

In testimony whereof, have signed my name to this specification.

JOHN L. EBBELS.

Copies of this patent may be obtained for five cents each, by addressing the "Commissioner of Patents, Washington, D. C."